United States Patent [19]

Hussain

[11] 4,032,358

[45] June 28, 1977

[54] PRODUCING GLASS FIBER CONTAINING EPOXY RESIN ADHESIVE FILMS

[75] Inventor: Amir Hussain, Munich, Germany

[73] Assignee: Siemens Aktiengesellschaft, Berlin & Munich, Germany

[22] Filed: Sept. 22, 1976

[21] Appl. No.: 725,538

[30] Foreign Application Priority Data

Oct. 8, 1975 Germany .......................... 2545149

[52] U.S. Cl. ......................... 106/311; 260/29.2 EP; 260/2 N
[51] Int. Cl.² ......................................... C08K 5/07
[58] Field of Search .............. 106/311; 260/29.2 EP

[56] References Cited

OTHER PUBLICATIONS

Chem. Abst. 62:1800e, 1965.

*Primary Examiner*—Theodore Morris
*Attorney, Agent, or Firm*—Hill, Gross, Simpson, Van Santen, Steadman, Chiara & Simpson

[57] ABSTRACT

A method for producing glass fiber containing epoxy resin adhesive films wherein dicyandiamide hardener is dissolved in a solvent of water and diacetone alcohol.

4 Claims, No Drawings

PRODUCING GLASS FIBER CONTAINING EPOXY RESIN ADHESIVE FILMS

BACKGROUND OF THE INVENTION

For the production of multi-layered circuits, use is made of epoxy-resin adhesive films which comprise a fiber glass mat impregnated with epoxy resin. On a 100 weight percent basis, a film comprises about 45 weight percent glass fibers, inclusive of additives, and about 55 weight percent epoxy resin. In 100 parts by weight of the epoxy resin, there are about 3 parts by weight of a hardener, dicyandiamide, as the epoxy resin is used for the impregnation of the starting glass fiber mat (or tissue). After impregnation of the glass fiber mat, a plurality of these foils are interdigitated with a plurality metallic conductor foils and the resulting alternately multilayered sandwich-like arrangement is hardened under pressure at a temperature of about 170° C. Customary solvents in which the hardener is preliminarily dissolved before being mixed with the epoxy resin are methyl glycol and N,N-dimethylformamide. Each of these solvents has a low flash point, which is below 500° C. For reasons of safety, it would be desirable not to employ solvents of this kind.

BRIEF SUMMARY OF THE INVENTION

More particularly, the present invention relates to an improvement in a process for making glass fiber containing epoxy resin films of the type above characterized whereby the dicyandiamide hardener is preliminarily dissolved in a solvent comprising essentially water and diacetone alcohol (4-hydroxy-4-methyl pentanone-2).

One object of this invention is to provide a solution of dicyandiamide which is characterized by having a flash point above 500° C. and which is suitable for use in the manufacture of films of the type above characterized.

Another object of this invention is to provide an improved method for the production of adhesive films comprised of epoxy resin and glass fibers as above illustrated which method utilizes a solvent for the dicyandiamide that is readily compatible with the epoxy resin and that has a substantially higher flash point, that is above 500° C compared to prior art solvents previously used. The solvent used, moreover, should not adversely affect the adhesive capacity of the adhesive films and preferably should even improve such capacity.

These and other and further objects, aims, purposes, features, aspects, and the like will be apparent to those skilled in the art from the accompanying specification.

DETAILED DESCRIPTION

Solutions of the kind provided by the present invention satisfy the above objects and in addition possess further outstanding, unexpected advantages and features.

Thus, for one thing diacetone alcohol mixes readily with water. The use of water in the production of epoxy resin adhesive films and laminated circuit boards made therefrom was previously in itself considered hazardous. The possibility existed that portions of a laminate containing epoxy resin would be warped or swollen through the generation of stream. Surprisingly in the present invention it was found that, by comparison to the solvents hitherto employed (above indicated), the cross-linking density in a cured epoxy resin adhesive film is raised by the proportion of water in the solvent mixture used in accordance with the teachings of this invention. This increase is believed attributable to the fact that the water and the diacetone alcohol are not deposited in a free molecular structure within the chain of a cured epoxy resin, but that instead their hydrogen atoms are incorporated directly into the -OH groups in these chains. In the case of the known solvents (above identified) the molecules of these substances are deposited between the chains of the epoxy resin, so that the cross-linking density is restricted by this. Consequently the mechanical or thermo-mechanical loading capacity associated with an individual cured adhesive film is considerably raised through the use of the solvent provided in accordance with this invention. Swelling or warping in a cured adhesive film does not occur in a multi-layer circuit laminate structure produced making use of the solvent provided by this invention.

Technology for making the glass fiber containing epoxy resin adhesive films described hereinabove and known to the prior art are well known to those skilled in the art and so are not detailed herein. A preferred range of film thicknesses in films made using the teachings of this invention extends from about 0.08 to 0.20 millimeters.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

A solvent mixture consisting of 65 parts by weight of diacetone alcohol and 13.3 parts by weight of water is prepared. This solvent mixture has a flash point above 640° C. In this solvent mixture is dissolved 3 parts by weight of the hardener dicyandiamide.

In such a solution, by the teachings of this invention, it has been discovered that the individual weights of the component substances are only slightly variable. Thus, the ratio of the water to the diacetone alcohol should not vary by more than about ± 5% by weight from the stated values at any time. If more water is added to the diacetone alcohol, then it is found that free water deposition occurs between the chains of the epoxy resin. A warping of product circuit boards cannot then be avoided. The ratio of the diacetone alcohol to the dicyandiamide, is an optimum one, and while in itself less critical than that between the water and the diacetone alcohol, if this ratio is altered by more than ± 5% by weight from the stated value the viscosity of the resulting solvent mixture is disadvantageously changed.

I claim:

1. In an improved method for the production of glass fiber epoxy resin adhesive films, the step of dissolving the hardener dicyandiamide in a solvent comprised of diacetone alcohol and water.

2. The method of claim 1 wherein said solvent consists of about 65 ± 5% by weight parts of diacetone alcohol, 13.3 parts by weight of water and wherein about 3 ± 5% by weight of dicyandiamide are dissolved.

3. The method of claim 1 wherein said solvent consists of 65 parts by weight of diacentone alcohol and 13.3 parts by weight of water and wherein 3 parts by weight of dicyandiamide are dissolved.

4. A solution comprising a solvent consisting of about 65 parts by weight diacetone alcohol and about 13.3 ± 5% parts by weight of water wherein is dissolved about 3 parts by weight dicyandiamide.

* * * * *